June 6, 1933.   G. E. SCRUBY   1,912,952
BOX
Filed Jan. 5, 1932   7 Sheets-Sheet 1

Inventor
G. E. Scruby.
By Lacey & Lacey,
Attorneys

June 6, 1933.  G. E. SCRUBY  1,912,952
BOX
Filed Jan. 5, 1932    7 Sheets-Sheet 3

June 6, 1933.  G. E. SCRUBY  1,912,952
BOX
Filed Jan. 5, 1932  7 Sheets-Sheet 4

Inventor
G. E. Scruby.
By Lacey & Lacey, Attorneys

June 6, 1933.　　　G. E. SCRUBY　　　1,912,952
BOX
Filed Jan. 5, 1932　　　7 Sheets-Sheet 6

Inventor
G. E. Scruby.
By Lacey & Lacey,
Attorneys

June 6, 1933.  G. E. SCRUBY  1,912,952
BOX
Filed Jan. 5, 1932   7 Sheets-Sheet 7

Inventor
G. E. Scruby.
By Lacy & Lacy,
Attorneys

Patented June 6, 1933

1,912,952

UNITED STATES PATENT OFFICE

GEORGE E. SCRUBY, OF OKLAHOMA CITY, OKLAHOMA; LALIAH M. SCRUBY ADMINISTRATRIX OF SAID GEORGE E. SCRUBY, DECEASED

BOX

Application filed January 5, 1932. Serial No. 584,862.

This invention relates to folding paper boxes and has for one object to provide a paper box that can be shipped flat, may be easily folded to produce a strong rigid attractive display package and which incorporates features that permit the use of loose "Cellophane" or other transparent material for visibility of the contents.

A further object is to provide a folding paper box which is so constructed that a portion of the paper directly over the transparent material can be removed and folded back as an upright advertising display with the visible contents of the package directly in front thereof.

Another object is to produce a paper box which is so folded that two or more thicknesses of the paper exists between which a loose "Cellophane" or other transparent sheet may be firmly secured without the use of mechanical fastenings, gluing, stitching or taping.

Another object is to provide a paper box which, when folded, presents an unbroken finished appearance on both the inside and on the outside of the box.

A further object is to provide a paper box which may be rapidly folded into set-up position without the use of any extraneous fastening means whatsoever.

Another object is to provide a folding paper box which will have several thicknesses of paper reinforcing and strengthening the box.

Another object is to provide a folding paper box which is especially suited to all-over printing designs covering the entire inside and entire outside of the box when folded and set up for use.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification.

Figure 6:
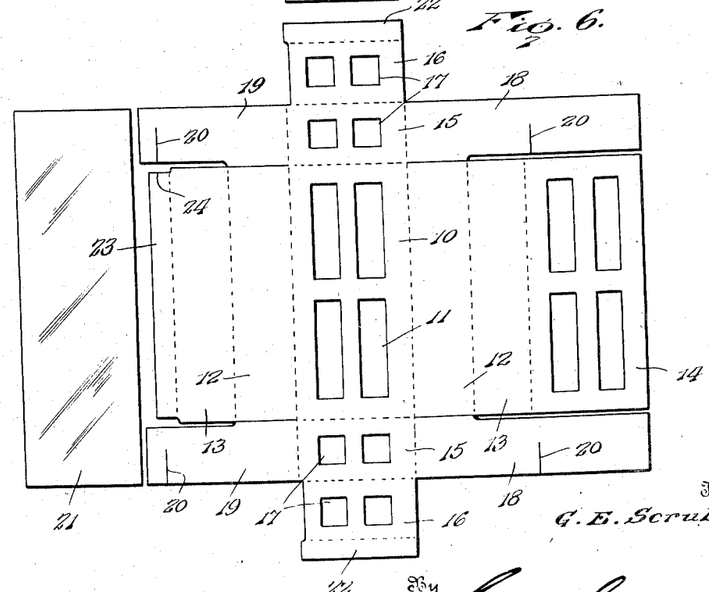
Fig. 6 is a plan view of the cover blank of the box.

Referring to Fig. 6 of the drawings, the cover blank of the box is shown as cut from a suitable sheet of box stock to provide a top 10 having cut out portions to provide sight openings 11 which may be of any desired shape. The cover blank also includes side walls 12 and 13 disposed laterally of the top 10 as well as a cut out counterpart of the top 10 constituting an inner top 14 when the box is expanded to set-up position, the blank being furnished with score lines, as illustrated, to facilitate bending.

In addition, the blank also includes end walls 15 and 16 having cut out sight openings 17, which register when the walls are folded upon each other, and constitute windows in the double end walls of the cover, the blank being furnished with score lines to facilitate bending of the end walls.

In addition, the blank also includes side wings or flaps 18 and 19 which are scored to be bent to form inner reinforcing walls for the box and these are notched, as shown at 20, to interengage.

A single loose sheet of "Cellophane" 21 or other suitable transparent material is furnished with the blank and is preferably of the same width as the top 10 and of a length equal to the top 10 and the two end walls 15 contiguous thereto so as to cover the entire area of these parts and extend over the sight openings of the top and end walls when the box is expanded to set-up position.

It will be now particularly pointed out that the terminal end walls 16 of the blank are provided with flaps 22 which are adapted to be angularly bent along corresponding score lines. Also one side wall 13 is provided with a longitudinal flap 23 which likewise is designed to be angularly bent along a corresponding score line, as indicated. The purpose of these flaps is to provide clamping means for securing the transparent sheet without the use of any extraneous fastening devices whatsoever.

Figures 1, 2, 3, 4:
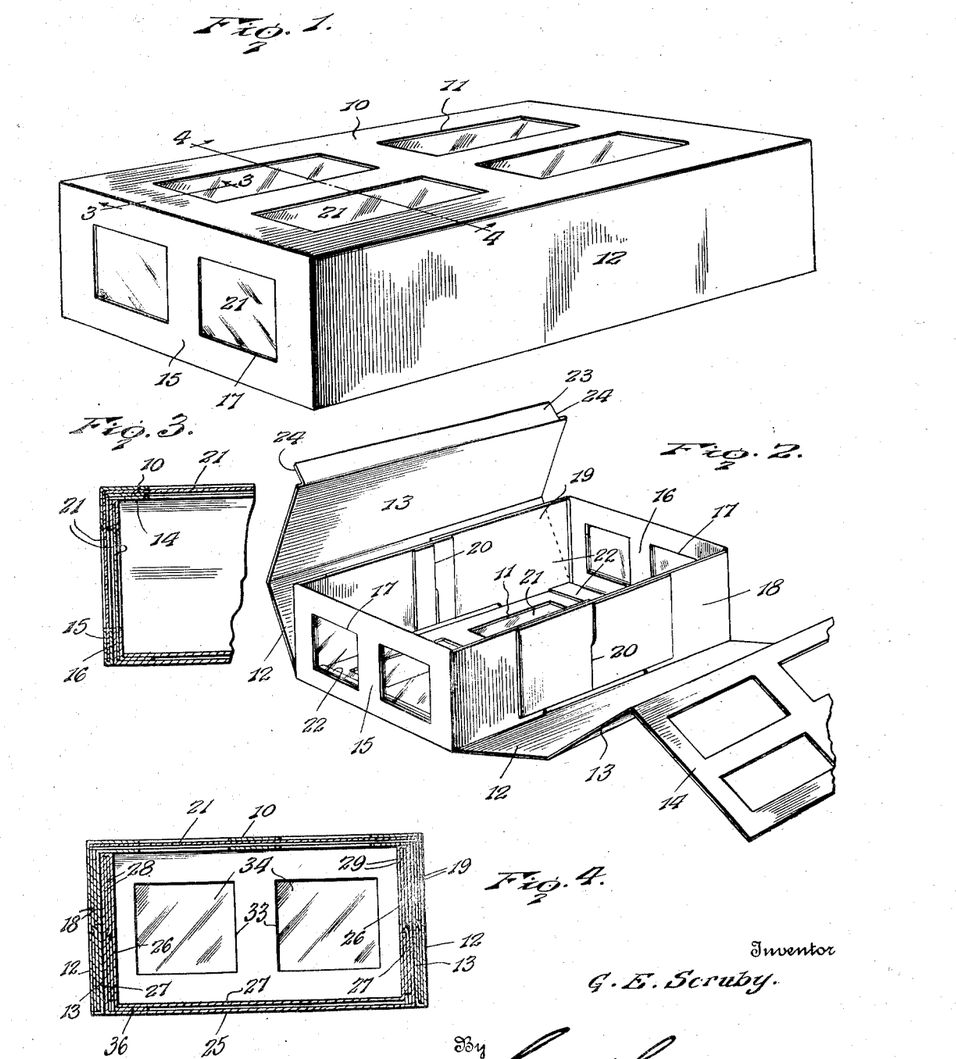
Figure 1 is a perspective view showing the completed box.
Fig. 2 is a perspective view showing the cover partly folded.
Fig. 3 is a section on the line 3—3 of Fig. 1.
Fig. 4 is a section on the line 4—4 of Fig. 1.

The folding of the cover will be more fully understood by referring to Fig. 2 in which it will be seen that the end walls 15 are bent along the score lines perpendicular to the top carrying with them the side flaps 18 and 19. The side flaps are then interlocked by interengaging the kerfs or slits thereof. This initial bending produces an initial thickness of side and end walls.

Now the transparent sheet 21 may be inserted to extend over the bottom and end walls. Next the end walls 16 are bent down to lie along the already folded end walls 15 and the clamping flaps 22, as will be seen, are then bent to lie upon the transparent sheet and hold it in place on the bottom while the double thickness of paper, constituting each end wall, securely confines the sheet at the ends of the cover.

To complete the folding of the cover, the left side wall 12 is now bent upwardly and the integral side wall 13 thereupon bent downwardly to enclose between them the corresponding flaps 19 already set up, making three thicknesses of paper which constitute the side wall. The clamping flap 23 is now bent to extend longitudinally along the margin of the transparent sheet and coact with the clamping flaps 22 in firmly holding the sheet against the top 10.

Finally, the right side wall 12 is bent upwardly, then the integral side wall 13 bent downwardly to enclose between them the corresponding notched flaps 18, thus providing also three thicknesses of the paper as constituting this side wall of the box. The counterpart 14 of the top 10 is now bent at a right angle to extend over the clamping flaps 22 and 23 and hold the same firmly in place. It will be observed, by referring to the cover blank, that the ends of the clamping flap 23 are cut away, as shown at 24. The purpose of this is to terminate the fastening flap short of the double end wall when the cover is expanded to set-up position so that the inner thickness of paper 13 may extend in back of the edges of the folded inner thicknesses of paper 16 at the ends of the cover to eliminate any tendency of buckling.

The body portion of the box is constructed and folded in a manner similar to that described above in connection with the manufacture of the box cover. It is practically a duplicate of the cover and is to be telescopically assembled so as to approximately coincide in dimensions with the cover, as best shown in Fig. 4.

Figure 5:
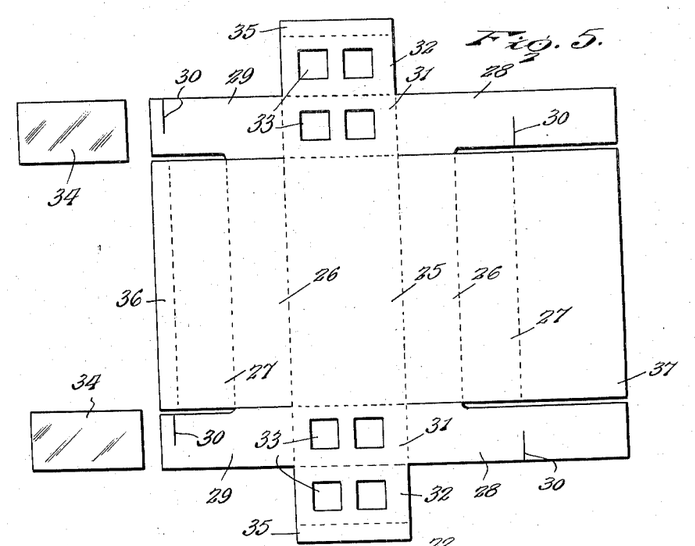
Fig. 5 is a plan view of the body blank of the box.

The body of the box also is formed from a single blank, see Fig. 5 of box stock cut to provide a bottom 25, integral lateral side walls 26 and 27, inner side flaps 28 and 29 provided with notches 30 to interfit, and end walls 31 and 32. Said end walls are provided with sight openings 33. A pair of loose "Cellophane" blanks 34 or similar transparent blanks is provided to be inserted between the double end walls 31 and 32 when the body is expanded to set-up position and these sight openings or windows, of course, register with the corresponding sight openings or windows in the end walls of the cover, when the box is closed.

It will be observed, by referring to Fig. 5, that the end walls 32 are provided with clamping flaps 35 and that one of the side walls 27 is provided with a clamping flap 36, these flaps extending along the ends and one longitudinal side of the bottom 25, when the body is folded, and reinforcing the bottom. It will also be observed that the counterpart of the bottom 25 or inner bottom 37 which is integral with the opposite side wall 27 is imperforate and, when folded down upon the folded clamping flaps, the bottom of the box presents a very strong rigid reinforced structure which is not likely to buckle under severe conditions of service.

The peculiar folding of the cover and body of the box from blanks cut as above described permits of the box stock being coated or finished on one side only and printed on one side only, and, when the box is expanded or set-up, the printing will appear through the entire inside of the box and entire outside of the box, if desired, since it will be observed that the coated surface of the stock is exposed to view when the box is expanded or set-up while the rough surface is on the unexposed or contacting faces of the parts. Consequently, low cost production is promoted by the use of cheaper box stock while at the same time the box presents an unbroken finished appearance on both the inside and the outside which finish is especially suited to all-over printing designs to lend attractiveness.

A modified form of the box is shown in Figs. 7 to 14, inclusive. In addition to the features pointed out above, the modified box permits of that portion of the cover above the transparent window being folded to upright position to provide an advertising display in front of which the contents of the box are directly exposed through the transparent window.

Figure 13:
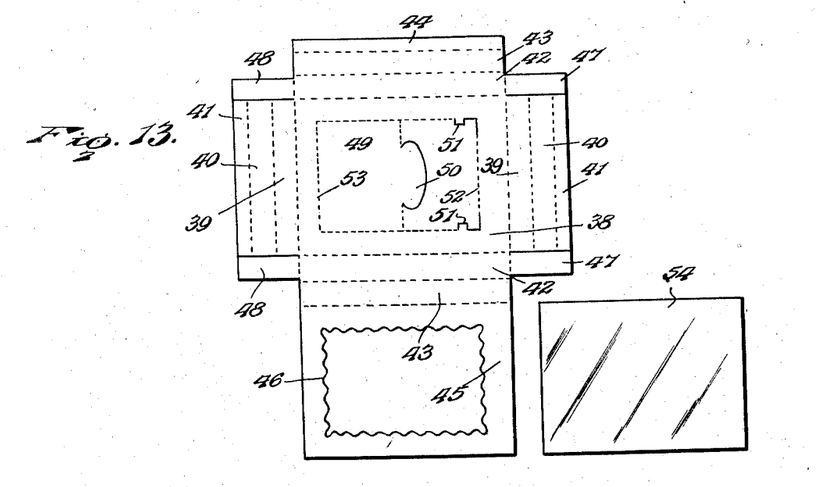
Fig. 13 is a plan view of the cover blank of the box.

In the modified form of box, it will be seen by referring to Fig. 13, that the cover is cut out from a suitable blank of box stock to provide a top 38, and laterally thereof, end walls 39 and 40, these walls terminating in integral clamping flaps 41. The blank is properly scored, to facilitate folding thereof, as shown. Integral with the top there are also provided longitudinal side walls 42 and 43, one of the side walls 43 terminating in a clamping flap 44 while the other side wall 43 terminates in a flap 45 of the same longitudinal and cross dimensions as the top 38 and which constitutes an inner top. The latter is cut out, as shown at 46, to provide a sight opening. The blank is also properly scored, as indicated, to accommodate folding of the side walls and inner top.

Integral with the side walls 42 there are end flaps 47 and 48 which are properly scored at their juncture with said walls for folding.

Figure 7:
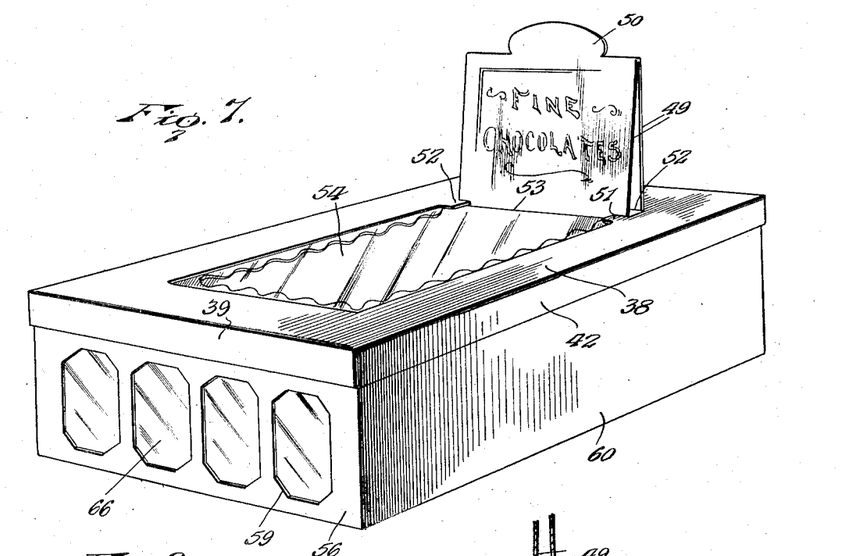
Fig. 7 is a perspective view of a modified form of box with advertising display.
Figure 8:
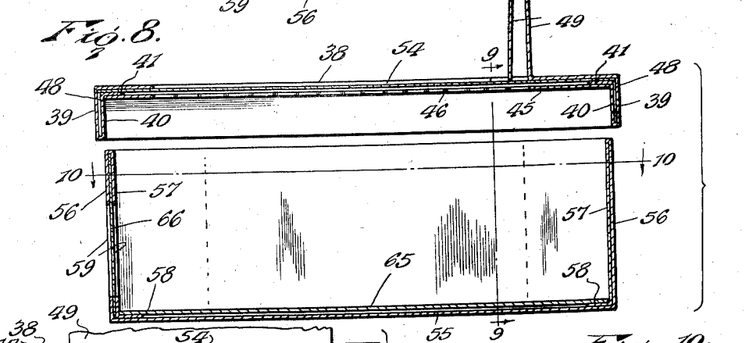
Fig. 8 is a longitudinal sectional view through the box shown in Fig. 7.
Figure 9:
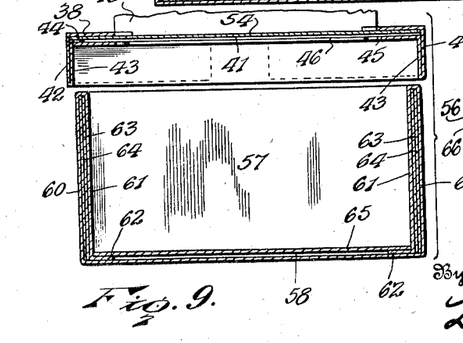
Fig. 9 is a section on the line 9—9 of Fig. 8.
Figure 10:
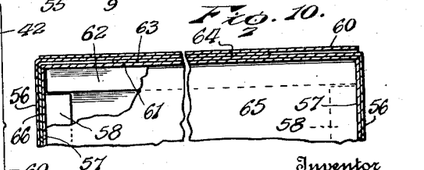
Fig. 10 is a section on the line 10—10 of Fig. 8.

Also, the top 38, is provided with perforations defining a substantially rectangular area along which the top may be torn and bent up at the rear edge to provide an upright display placard 49. The placard is scored centrally, and intermediate the ends the score has an oval cut so that the placard may be centrally folded upon the score to provide a double thickness, as best shown in Fig. 7, the front portion of which terminates at the top in an oval tab 50 which may be grasped by the fingers to manipulate the placard while anchoring the same. For anchoring the placard, a pair of projections 51 is provided by suitably forming the line of perforations, these projections being spaced sufficiently from the secured end 52 of the placard to permit the free end 53 thereof being slipped in behind the projections to maintain the placard upright, as will be understood.

A single "Cellophane" sheet 54, or other transparent sheet, is provided to extend over the sight opening 46 of the cover.

Figure 11:
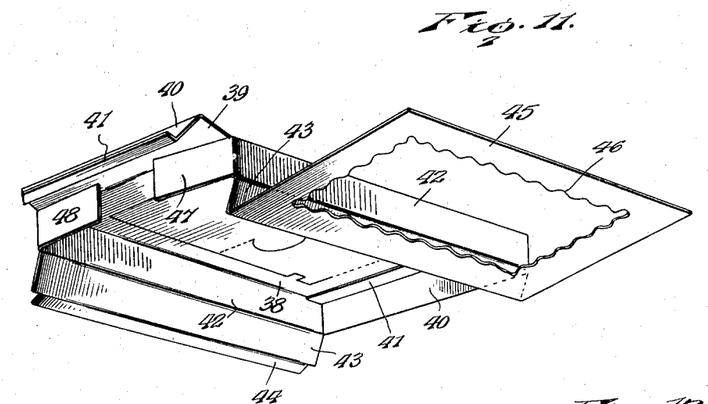
Fig. 11 is a bottom perspective view of the box cover partly folded.

The cover is folded in substantially the same manner as above described in connection with the folding of the cover of the preferred form of the invention and, as best illustrated in Fig. 11, the side walls 42 may be first bent along the score lines and thereupon the end flaps 47 and 48 may be bent at right angles to the side walls. Next, the end walls 39 and 40 may be bent along the score lines to enclose between them the folded end flaps 47 and 48. The transparent sheet 54 may now be laid loose against the top. Thereupon, the clamping flaps 41 may be bent over the sheet to clamp the same in position. Next, the left longitudinal wall 42 and contiguous wall 43 may be bent to form a double longitudinal wall and the clamping flap 44 may be directed over the adjacent longitudinal margin of the transparent sheet. Next, the right side walls 42 and 43 may be bent to provide a double thickness of the paper, and the integral inner cover 45 may now be bent over the transparent sheet and folded clamping flaps to complete the folding.

Figure 14:
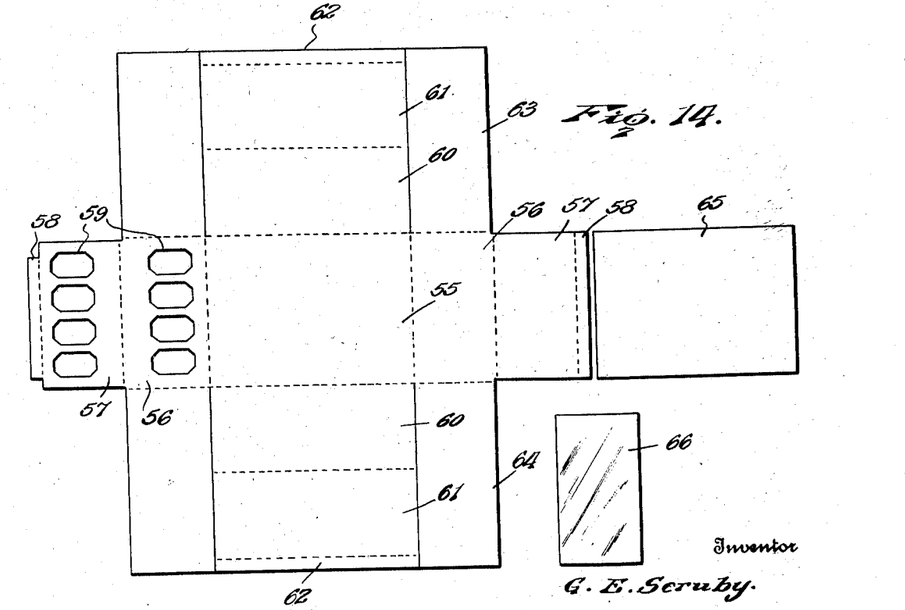
Fig. 14 is a plan view of the body blank of the box.
Figure 15:
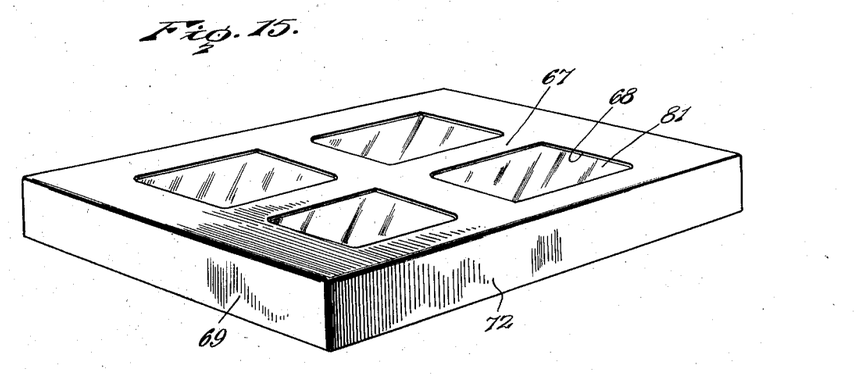
Fig. 15 is a perspective view of another modified form of the box.

The body of the box as shown in Figure 14 is formed from a suitable blank of box stock cut to provide a bottom 55 having laterally thereof end walls 56 and 57 which terminate in clamping flaps 58, the blank being scored, as indicated, to accommodate folding. One pair of the end walls, which will be at the front of the box when the body is expanded or set up, is provided with sight openings 59.

Integral with the longitudinal edges of the bottom are side walls 60 and 61 which terminate in clamping flaps 62, the blank being properly scored to facilitate folding, as shown.

Integral with the end walls 56 are side flaps 63 and 64 which are of sufficient length to overlap, when folded, the blank being properly scored to facilitate folding.

The completed body structure comprises a separate bottom 65 which is of the same general dimensions as the bottom 55, and also a single "Cellophane" sheet 66 or other transparent sheet which is of the same general dimensions as the front end walls which carry the sight openings 59.

Figure 12:
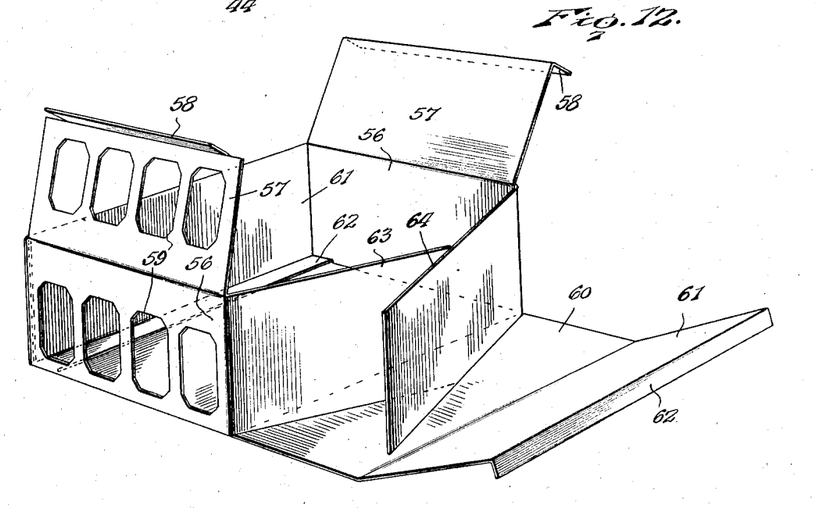
Fig. 12 is a perspective view of the box body partly folded.

Fig. 12 shows the body of the box in the process of being folded. Briefly, the side flaps 63 and 64 may be folded to overlap, whereupon the side walls 60 and 61 on the left side of the box may be folded to enclose between them the folded side flaps with the clamping flap 62 extending along the bottom of the box. The end walls 56 and 57 may be thereupon folded to provide a double thickness of paper at the ends of the box and the clamping flaps 58 may be thereupon extended along the bottom of the box. Next, the right side walls 60 and 61 may be folded over the side flaps 63 and 64 and the clamping flap 62 thereupon extended along the bottom of the box. Next, the separate bottom 65 may be applied. The transparent sheet 66 can be interposed between the end walls 56 and 57, having the sight openings 59, during the process of folding these parts and will be firmly clamped in place between these side walls without extraneous fastening means.

It will be observed that the window at the front of the box permits the contents of the box being viewed prior to being dispensed. When it is desired to dispense the contents, the placard 49 may be detached around three of its edges and elevated to the position shown in Fig. 7 thereby exposing the transparent cover window 54 so that the contents may be viewed both from the front and from the top of the box. It will be pointed out that the placard, before detachment, forms a protection for the contents of the box during storage and shipment. It will be further pointed out that when the placard is in use as an advertising display, the cover of the box may be removed as often as desired until the contents are exhausted without disturbing the transparent windows. Should the transparent material become damaged, it will be simply necessary to cut another sheet from a reserve supply of the material and replace the old one since no pasting, taping or metal fastening devices are required to assemble the transparent sheet with either the cover or the body of the box.

Another modified form of box is shown in Figures 15 to 22, inclusive, this modified form being a multiple thickness telescopic box of substantially identical structure and folding as the preferred form of the invention, the distinction being that windows are disposed in the top of the cover only, the double side walls are adhesively bonded together, and the contiguous parts of the structure which form the corners overlap and interfit, thereby producing an extremely strong display container for fresh meats or the like.

Figures 16, 17, 18:
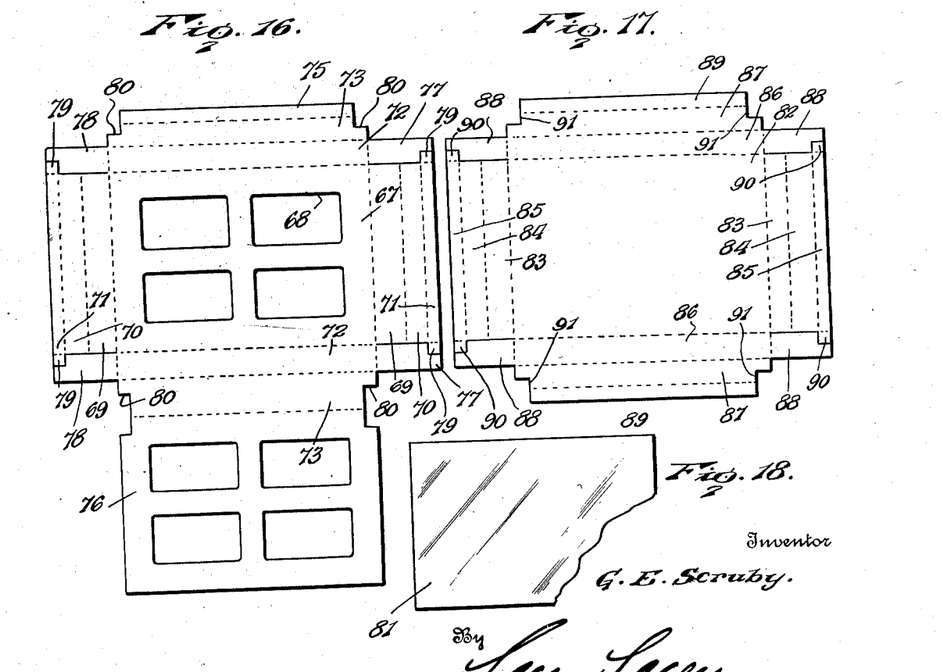
Fig. 16 is a plan view of the cover blank of the box.
Fig 17 is a plan view of the body blank of the box.
Fig. 18 is a fragmentary plan view of the transparent sheet of the box.

The cover blank as shown in Figure 16 is formed from a suitable blank of box stock cut to provide a top 67 having sight openings 68, and integral therewith end walls 69 and 70 terminating in clamping flaps 71, the blank being properly scored to accommodate folding as heretofore described.

Figure 19:
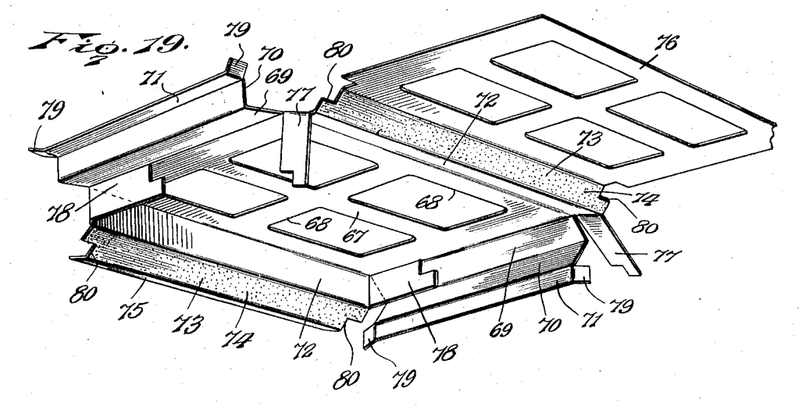
Fig. 19 is a bottom perspective view of the box cover partly folded.

Integral with the top are side walls 72 and 73 scored to be folded upon each other and produce double thickness of paper. It is preferable, although not essential, to stick the contacting faces of the paper together by a suitable adhesive 74 which may be applied to both walls, or to one wall 73 on each side of the cover, as shown in Figure 19. The wall 73 on one side of the cover terminates in a clamping flap 75, while the corresponding wall 73 on the opposite side of the cover terminates in a counterpart of the top 67 and which constitutes an inner top 76 the sight openings of which register with the sight openings in the outer top when the cover is expanded.

Integral with the side walls 72 are end flaps 77 and 78 which are properly scored at their junctures with said walls for folding.

Figures 20, 21:
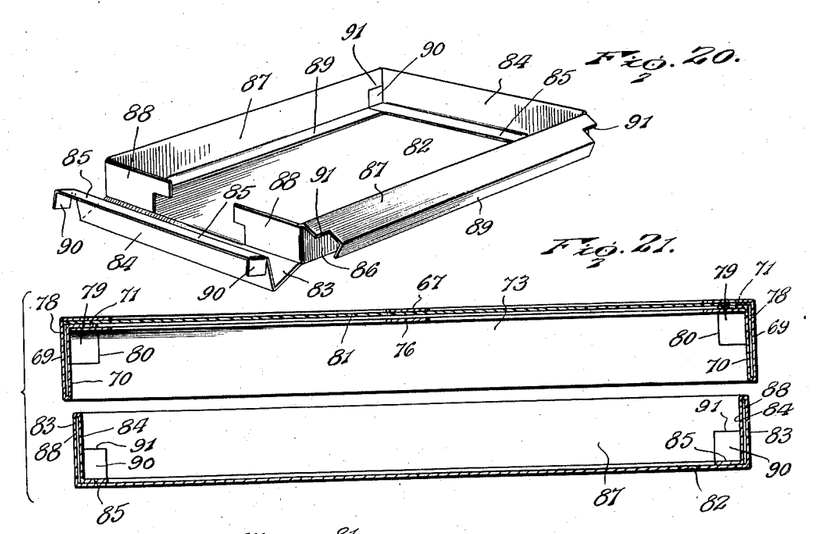
Fig. 20 is a perspective view of the box body partly folded.
Fig. 21 is a longitudinal sectional view through the box with the cover and body separated.

It will be observed that the clamping flaps 71 of the end walls terminate at the ends in tabs 79 properly scored to be bent at a right angle to the plane of the flap and extend along the outer side walls 72 and engage within notches 80 cut in the ends of the inner side walls 73 as best shown in Figure 21, whereby the cover structure is reinforced at the corners against buckling.

A "Cellophane" sheet 81 or similar transparent sheet is provided. the dimensions being approximately the same as the dimensions of the inner and outer tops 67 and 76. The sheet is to be inserted between these parts to form windows as heretofore explained.

The cover is folded substantially in the same manner as above described, the side walls 72 being bent along the score lines and the end flaps 77 and 78 being bent at right angles to the side walls. Next the end walls 69 and 70 are bent along the score lines to enclose between them the folded end flaps. The transparent sheet 81 may now be laid loose against the top 67. Thereupon the clamping flaps 71 may be bent over the sheet to clamp the same in place. Next the left side wall 73 may be bent inwardly against the side wall 72 to form the double side wall, it being of course understood, that the mucilage or other adhesive will be moistened to cause the walls to be bonded together as a unit. The clamping flap 75 is next directed over the longitudinal margin of the transparent sheet. In like manner the side wall 73 on the right side of the cover is folded and stuck to the corresponding side wall 72 and the integral inner cover 76 is now bent over the transparent sheet and folded clamping flaps to complete the folding.

Figure 22:
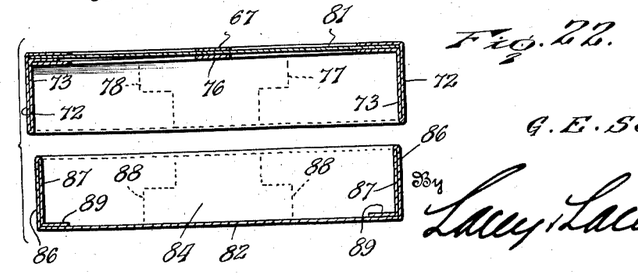
Fig. 22 is a cross sectional view through the box with the body and cover separated.

The body of the box is practically a duplicate of the cover as to structure and folding with the exception that the sight openings are dispensed with, and the bottom is formed of a single thickness of paper. The dimensions of the body is such that the body may be telescopically received in the cover as best shown in Figures 21 and 22.

As shown in Figure 17 the blank of box stock forming the box body is cut to provide a bottom 82 having integral end walls 83 and 84 and clamping flaps 85. Integral with the body are side walls 86 and 87 terminating in clamp flaps 88. Integral with the side walls 86 are end flaps 88. The clamping flaps 85 of the end walls are provided with terminal tabs 90 which are received in notches 91 cut in the side walls 87 when the body is expanded. The blank is properly scored to facilitate bending as shown.

The folding of the box body is best shown in Figure 20 and since the folding is accomplished by the same sequence of steps as above described in connection with the folding of the cover, it is believed that a detailed description of the folding operation is unnecessary.

It will be particularly pointed out that in all the forms of the invention the folding operation may be quickly and rapidly accomplished without the use of mechanical fastenings such as gluing, stitching, taping or the like. It will also be noted that in each style of box the paper is folded over upon itself to produce two or more thicknesses between which the transparent material may be inserted loose. Furthermore, when the transparent material is inserted loose the structure of the box is such that the sheet is securely locked and held in position by clamping flaps or between two thicknesses of paper. In appearance, each form of the box is finished inside and outside due to the peculiar folding thereof, enabling the coated side only, to be exposed, while there are no cuts, scores or unsightly fastenings appearing on either the inside or the outside of the box.

What is claimed is:

1. A paper box formed of a single blank of box stock folded to produce double end walls, double side walls and double perforated walls connecting the side and end walls, the inner end walls and one of the inner side walls terminating in clamping flaps, and a loose transparent sheet disposed between the inner and outer perforated walls and clamped against one of said walls by said clamping flaps.

2. A paper box formed from an integral blank folded upon itself to produce side walls, end walls and a connecting wall each formed of a plurality of thicknesses, the end walls and the connecting walls being provided with sight openings, a loose transparent sheet laid between the thicknesses of the connecting and end walls and forming windows over the sight openings, and integral clamping flaps carried by the innermost thickness of both end walls and one of the side walls and extending between the thicknesses of the connecting wall for clamping the transparent sheet in place.

3. A paper box formed of an integral blank folded upon itself to produce double side, end and connecting walls, the blank being coated on one side and the coated side being exposed upon the entire interior and exterior of the box with the rough side concealed and forming the contacting surfaces of the double walls, certain of the walls being provided with sight openings, a loose transparent sheet clamped between the thicknesses of the last named walls for closing said openings, and integral clamping flaps carried by the innermost thickness of both end walls and one of the side walls and extending between the thicknesses of the connecting wall for clamping the transparent sheet in place.

4. A paper box formed of a single blank of box stock folded to produce double end walls, double side walls and a double top, the outer thickness of the double top being provided with perforations to produce a display placard when the material is torn along the line of perforations, said perforations being outlined to produce opposite inwardly extending tabs, said placard being scored transversely whereby it may be bent back upon itself and the free edge engaged in rear of said tabs to maintain the placard upright, the inner thickness of material constituting the cover being perforated to produce a sight opening, and a loose transparent sheet confined between both thicknesses of material constituting the top.

5. A paper box formed of an integral blank of box stock folded upon itself to produce inner and outer side walls, inner and outer end walls and an inner and outer tops the parts being contiguous one with the other, the inner top being provided with a sight opening the outer top being perforated to permit of a portion thereof being detached and bent at an angle to provide a display placard, and a loose transparent sheet confined between the inner and outer top and producing a window when said display placard is in use.

6. A paper box formed of an integral blank of box stock folded upon itself to produce double side, end and connecting walls, the inner thickness of the end walls and the inner thickness of the side walls terminating in flaps adapted to be bent at a right angle to the plane of the walls, there being notches in the adjacent inner thickness of the side and end walls receiving said flaps when the box is expanded, said flaps reinforcing the corners of the box, the connecting wall being perforated to produce sight openings, a loose transparent sheet confined between the thicknesses of the connecting wall and closing said sight openings, and integral clamping flaps carried by the innermost thickness of both end walls and one of the side walls and extending between the thicknesses of the connecting wall for clamping the transparent sheet in place.

In testimony whereof I affix my signature.

GEORGE E. SCRUBY.